US012584203B2

(12) United States Patent
Ichie

(10) Patent No.: US 12,584,203 B2
(45) **Date of Patent: *Mar. 24, 2026**

(54) STEEL SHEET FOR NON-ORIENTED ELECTRICAL STEEL SHEET

(71) Applicant: NIPPON STEEL CORPORATION, Tokyo (JP)

(72) Inventor: Takeru Ichie, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 517 days.

This patent is subject to a terminal disclaimer.

(21) Appl. No.: 17/789,473

(22) PCT Filed: Feb. 19, 2021

(86) PCT No.: PCT/JP2021/006351
§ 371 (c)(1),
(2) Date: Jun. 27, 2022

(87) PCT Pub. No.: WO2021/167066
PCT Pub. Date: Aug. 26, 2021

(65) Prior Publication Data

US 2023/0046884 A1 Feb. 16, 2023

(30) Foreign Application Priority Data

Feb. 20, 2020 (JP) ................................ 2020-027002

(51) Int. Cl.
*C22C 38/16* (2006.01)
*C22C 38/00* (2006.01)
(Continued)

(52) U.S. Cl.
CPC ............ *C22C 38/16* (2013.01); *C22C 38/001* (2013.01); *C22C 38/002* (2013.01);
(Continued)

(58) Field of Classification Search
CPC . C21D 1/02; C21D 1/84; C21D 6/008; C21D 8/1222; C21D 8/1261;
(Continued)

(56) References Cited

U.S. PATENT DOCUMENTS

2018/0327883 A1* 11/2018 Zaizen .................... C22C 38/60
2020/0399731 A1 12/2020 Ichie et al.
2023/0013043 A1* 1/2023 Ichie .................. H01F 1/14775

FOREIGN PATENT DOCUMENTS

CN 1611616 A 5/2005
EP 4112755 A1 * 1/2023 ............... C21D 1/26
(Continued)

*Primary Examiner* — Jie Yang
(74) *Attorney, Agent, or Firm* — Birch, Stewart, Kolasch & Birch, LLP

(57) ABSTRACT

What is provided is a steel sheet for a non-oriented electrical steel sheet containing, in mass %, C: 0.0040% or less, Si: 1.9% or more and 3.5% or less, Al: 0.10% or more and 3.0% or less, Mn: 0.10% or more and 2.0% or less, P: 0.09% or less, S: 0.005% or less, N: 0.0040% or less, B: 0.0060% or less, and the remainder comprising Fe and impurities, in which the recrystallization rate of the structure of a sheet thickness-direction cross section at each position 10 mm apart toward the sheet width center from each of both end portions in the sheet width direction is less than 50%, and, when the sheet width is represented by W, the recrystallization rate of the structure of a sheet thickness-direction cross section at the position of ¼W from each of both end portions in the sheet width direction is 50% or more.

4 Claims, 1 Drawing Sheet

(51) Int. Cl.

| | |
|---|---|
| ***C22C 38/02*** | (2006.01) |
| ***C22C 38/04*** | (2006.01) |
| ***C22C 38/06*** | (2006.01) |
| ***H01F 1/147*** | (2006.01) |

(52) U.S. Cl.
CPC .......... *C22C 38/005* (2013.01); *C22C 38/008* (2013.01); *C22C 38/02* (2013.01); *C22C 38/04* (2013.01); *C22C 38/06* (2013.01); *H01F 1/14791* (2013.01); *C22C 2202/02* (2013.01)

(58) Field of Classification Search
CPC ...... C21D 8/1272; C21D 8/1294; C21D 9/46; C22C 2202/02; C22C 38/001; C22C 38/002; C22C 38/004; C22C 38/005; C22C 38/008; C22C 38/02; C22C 38/04; C22C 38/06; C22C 38/16; C22C 38/60; H01F 1/14791; H01F 1/16
See application file for complete search history.

(56) References Cited

FOREIGN PATENT DOCUMENTS

| | | | |
|---|---|---|---|
| JP | 2000-226616 | A | 8/2000 |
| JP | 2002-371340 | A | 12/2002 |
| JP | 2005-200756 | A | 7/2005 |
| JP | 2006-45613 | A | 2/2006 |
| JP | 2012-36454 | A | 2/2012 |
| JP | 2016-211016 | A | 12/2016 |
| WO | WO 2019/182022 | A1 | 9/2019 |

* cited by examiner

STEEL SHEET FOR NON-ORIENTED ELECTRICAL STEEL SHEET

TECHNICAL FIELD

The present invention relates to a steel sheet for a non-oriented electrical steel sheet.

Priority is claimed on Japanese Patent Application No. 2020-027002, filed in Japan on Feb. 20, 2020, the content of which is incorporated herein by reference.

BACKGROUND ART

Recently, in the field of electrical equipment, particularly, motors, rotating machinery, small and medium-sized transformers, electrical components and the like in which a non-oriented electrical steel sheet is used as a material for the iron core, in response to movement for global environmental conservation represented by global power and energy savings, $CO_2$ reduction and the like, a demand for a high efficiency and size reduction has grown more intense. Under such a social environment, naturally, improvement in the performance of non-oriented electrical steel sheets is an urgent problem.

In order to improve the characteristics of motors, there is a demand for improvement in the magnetic characteristics of non-oriented electrical steel sheets such as an iron loss or magnetic flux densities. In order to improve the magnetic characteristics, a variety of attempts are underway regarding not only steel components but also crystal grain diameters in steel sheets, the control of metallographic structures such as crystal orientations, the control of precipitates and the like.

For example, Patent Document 1 discloses a non-oriented electrical steel sheet containing, in mass %, 0.10% to 0.30% of P and having a magnetic flux density of 1.70 T or more in terms of B50.

In addition, for example, Patent Documents 2 to 4 disclose techniques for controlling crystal orientations after cold rolling and recrystallization annealing and improving magnetic characteristics by segregating P at grain boundaries in a steel sheet before cold rolling.

CITATION LIST

Patent Document

Patent Document 1: Japanese Unexamined Patent Application, First Publication No. 2002-371340

Patent Document 2: Japanese Unexamined Patent Application, First Publication No. 2012-036454

Patent Document 3: Japanese Unexamined Patent Application, First Publication No. 2005-200756

Patent Document 4: Japanese Unexamined Patent Application, First Publication No. 2016-211016

SUMMARY OF INVENTION

Problems to be Solved by the Invention

However, in the techniques described in Patent Documents 1 to 4, there has been a problem in that the addition of the element to be segregated significantly degrades the toughness and the steel sheet fractures during threading in a pickling step. That is, it was not possible to satisfy both improvement in the toughness of steel sheets for a non-oriented electrical steel sheet and a low iron loss and high magnetic flux densities in the non-oriented electrical steel sheets.

The present invention has been made in consideration of the above-described problem, and an objective of the present invention is to provide a steel sheet for a non-oriented electrical steel sheet satisfying both hot-rolled sheet toughness and magnetic characteristics after cold rolling and annealing.

Means for Solving Problem

The present inventors repeated intensive studies regarding a method for satisfying both hot-rolled sheet toughness and magnetic characteristics after cold rolling and annealing in a non-oriented electrical steel sheet. As a result, it was found that, when the soaking temperature and time during hot-band annealing are controlled to be within specific ranges and the cooling rate is changed in the width direction, it is possible to realize a material having excellent hot-rolled sheet toughness and excellent magnetic characteristics. That is, it was found that, when a hot-rolled coil after hot-band annealing is annealed and the temperature is held during the conveyance of the hot-rolled coil, it is possible to satisfy both hot-rolled sheet toughness and magnetic characteristics after cold rolling and annealing. In the present invention, the hot-rolled sheet toughness means the toughness of a steel sheet for a non-oriented electrical steel sheet before a pickling process that has undergone a hot-band annealing process or a heat conservation treatment process and then a cooling process.

The gist of the present invention made based on the above-described finding is as described below.

[1] A steel sheet for a non-oriented electrical steel sheet containing, in mass %, C: 0.0040% or less,
Si: 1.9% or more and 3.5% or less,
Al: 0.10% or more and 3.0% or less,
Mn: 0.10% or more and 2.0% or less,
P: 0.09% or less,
S: 0.005% or less,
N: 0.0040% or less,
B: 0.0060% or less, and
a remainder comprising Fe and impurities,
in which a recrystallization rate of a structure of a sheet thickness-direction cross section at each position 10 mm apart toward a sheet width center from each of both end portions in a sheet width direction is less than 50%, and,
when a sheet width is represented by W, a recrystallization rate of a structure of a sheet thickness-direction cross section at a position of ¼W from each of both end portions in the sheet width direction is 50% or more.

[2] The steel sheet for a non-oriented electrical steel sheet according to [1], further containing, in mass %, one or two or more of Sn: 0.01% or more and 0.50% or less,
Sb: 0.01% or more and 0.50% or less, and
Cu: 0.01% or more and 0.50% or less.

[3] The steel sheet for a non-oriented electrical steel sheet according to [1] or [2], further containing, in mass %, one or two or more of one or two or more selected from REM: 0.00050% or more and 0.040% or less,
Ca: 0.00050% or more and 0.040% or less, and
Mg: 0.00050% or more and 0.040% or less.

Advantageous Effects of Invention

According to the present invention, it becomes possible to provide a steel sheet for a non-oriented electrical steel sheet satisfying both hot-rolled sheet toughness and magnetic characteristics after cold rolling and annealing.

EMBODIMENT FOR IMPLEMENTING THE INVENTION

Figure 1:
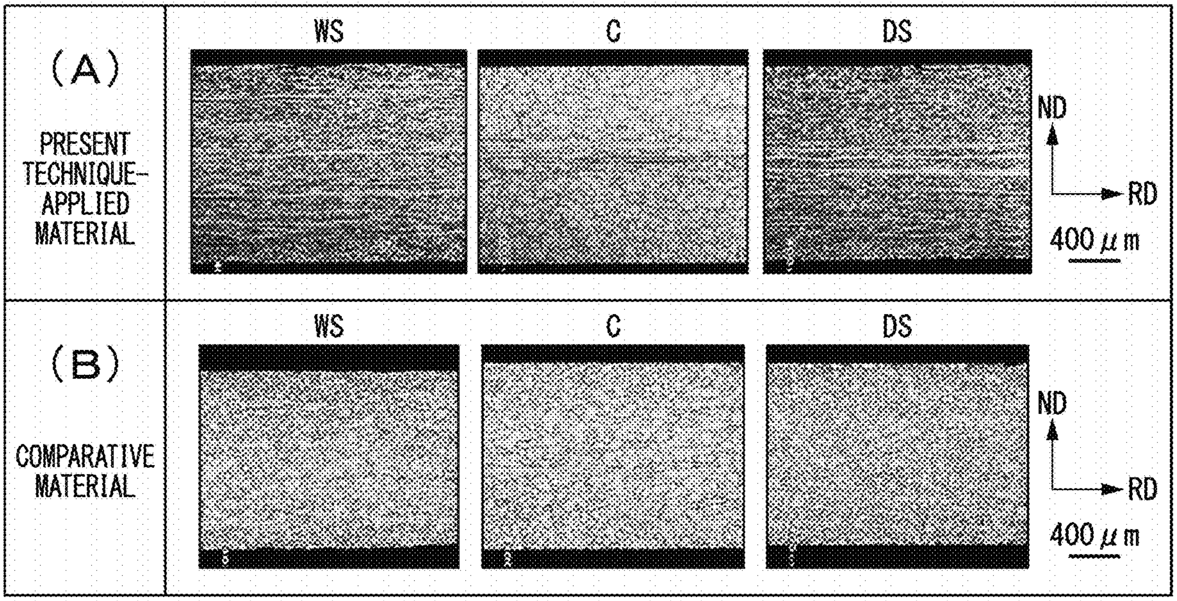
FIG. 1(A) is a schematic view for describing the metallographic structure of a steel sheet for a non-oriented electrical steel sheet according to the present embodiment.
FIG. 1(B) is a schematic view for describing the metallographic structure of a comparative material.

Hereinafter, a preferable embodiment of the present invention will be described in detail. However, the present invention is not limited only to a configuration disclosed in the present embodiment and can be modified in a variety of manners within the scope of the gist of the present invention. In the following description, there will be cases where specific numerical values or materials are exemplified, but other numerical values or materials may also be applied as long as the effect of the present invention can be obtained. In addition, individual configuration elements of the embodiment to be described below can be combined with each other.

<Steel Sheet for Non-Oriented Electrical Steel Sheet>

[Chemical Components]

First, the chemical components of a steel sheet for a non-oriented electrical steel sheet according to the present embodiment (hereinafter, the steel sheet for a non-oriented electrical steel sheet will also be simply referred to as the steel sheet) will be described. Hereinafter, unless particularly otherwise described, "%" sign indicates "mass %". In addition, the numerical limiting ranges to be described below include the lower limit value and the upper limit value in the ranges. Numerical values expressed with 'more than' or 'less than' are not included in numerical ranges.

(C: 0.0040% or Less)

C increases the iron loss of a non-oriented electrical steel sheet, which is a final product, and acts as a cause for magnetic aging. The C content of the steel sheet according to the present embodiment is 0.0040% or less. The C content is preferably 0.0030% or less and more preferably 0.0020% or less. The lower limit of the C content includes 0%; however, in consideration of industrial techniques, it is difficult to set the C content to 0%, and practically, the substantial lower limit is 0.0001%.

(Si: 1.9% or More and 3.5% or Less)

Si has an effect of reducing the iron loss by increasing the electrical resistance of the non-oriented electrical steel sheet to decrease the eddy current loss. In addition, Si also has an effect of improving the blanking accuracy into iron cores by increasing the yield ratio. When the Si content of the steel sheet is 1.9% or more, the above-described effect can be obtained. The Si content of the steel sheet is preferably 2.0% or more and more preferably 2.1% or more. On the other hand, when the Si content is excessive, the magnetic flux density of the non-oriented electrical steel sheet decreases, and, in the manufacturing steps of the non-oriented electrical steel sheet, the workability for cold rolling or the like deteriorates due to an increase in the yield ratio, and the costs increase, and thus the Si content is 3.5% or less. The Si content of the steel sheet is preferably 3.0% or less and more preferably 2.5% or less.

(Al: 0.10% or More and 3.0% or Less)

Al has, similar to Si, an action of reducing the iron loss by increasing the electrical resistance of the non-oriented electrical steel sheet to decrease the eddy current loss, but increases the yield strength to a small extent compared with Si. When the Al content is 0.10% or more, the iron loss reduces, the yield strength increases, and the yield ratio increases to improve the blankability into iron cores. The Al content of the steel sheet is preferably 0.20% or more. On the other hand, when the Al content of the steel sheet is excessive, the saturated magnetic flux density decreases, and the magnetic flux density is decreased. Furthermore, when the Al content of the steel sheet is excessive, the yield ratio reduces, and the blanking accuracy of the non-oriented electrical steel sheet decreases. Therefore, the Al content of the steel sheet is 3.0% or less. The Al content of the steel sheet is preferably 2.5% or less. The Al content may be 0.1% or more or may be 0.2% or more.

(Mn: 0.10% or More and 2.0% or Less)

Mn has effects of increasing the electrical resistance to reduce the eddy current loss and improving the primary recrystallization texture to develop a {110}<001> crystal orientation, which is desirable for improvement in the magnetic characteristics in a rolling direction. Furthermore, Mn suppresses the precipitation of a fine sulfide such as MnS, which is harmful to crystal grain growth. In order for such purposes, the Mn content of the steel sheet is 0.10% or more. The Mn content of the steel sheet is preferably 0.20% or more. On the other hand, when the Mn content is excessive, the crystal grain growth during annealing deteriorates, and the iron loss increases. Therefore, the Mn content of the steel sheet is 2.0% or less. The Mn content of the steel sheet is preferably 1.5% or less. The Mn content may be 0.1% or more or may be 0.2% or more.

(P: 0.09% or Less)

P has an effect of increasing the blanking accuracy of the non-oriented electrical steel sheet, but an increase in the P content makes the steel sheet extremely brittle. In steel sheets with Si≥2%, such a tendency is significant. Therefore, the P content of the steel sheet is 0.09% or less. The P content of the steel sheet is preferably 0.05% or less. The lower limit of the P content is not particularly limited, but is preferably set to 0.005% or more from the viewpoint of magnetic flux density deterioration by reduction of P.

(S: 0.005% or Less)

S is finely precipitated as a sulfide such as MnS and impairs recrystallization and crystal grain growth during final annealing or the like. Therefore, the S content of the steel sheet is 0.005% or less. The S content of the steel sheet is preferably 0.004% or less. The lower limit of the S content is not particularly limited, but is preferably set to 0.0005% or more from the viewpoint of an increase in the costs by desulfurization.

(N: 0.0040% or Less)

N decreases the coating rate of an internal oxide layer that is formed on the surface side of a hot-rolled sheet by the fine precipitation of a nitride such as AlN, which is formed during hot-band annealing or final annealing, and, furthermore, impairs recrystallization and crystal grain growth during final annealing or the like. Therefore, the N content of the steel sheet is 0.0040% or less. The N content of the steel sheet is preferably 0.0030% or less. The lower limit of the N content is not particularly limited, but is preferably set to 0.0005% or more from the viewpoint of an increase in the costs for reducing N.

(B: 0.0060% or Less)

B impairs recrystallization and crystal grain growth during final annealing or the like due to the fine precipitation of a nitride such as BN. Therefore, the B content of the steel sheet is 0.0060% or less. The B content of the steel sheet is preferably 0.0040% or less. The lower limit of the B content is not particularly limited, but is preferably set to 0.0001% or more from the viewpoint of an increase in the costs for reducing N.

The steel sheet according to the present embodiment preferably further contains, in mass %, one or two or more of Sn: 0.01% or more and 0.50% or less, Sb: 0.01% or more and 0.50% or less and Cu: 0.01% or more and 0.50% or less. Hereinafter, the amount of each element will be described. Sn, Sb and Cu are not essential in the steel sheet, and thus the lower limit of the amounts thereof is 0%. In addition, even when these elements are contained as impurities, the above-described effects are not impaired.

Sn, Sb and Cu have effects of improving the primary recrystallization texture of the base steel sheet, further developing the texture with the {110}<001> texture, which is desirable for improvement in the magnetic characteristics in the rolling direction, and further suppressing a {111}<112> texture or the like, which is not desirable for the magnetic characteristics. On the other hand, even when the Sn content, the Sb content or the Cu content increases, the above-described effects are saturated, and conversely, there are cases where the toughness of the steel sheet is degraded. Therefore, the base steel sheet preferably contains one or two or more of Sn: 0.01% or more and 0.50% or less, Sb: 0.01% or more and 0.50% or less and Cu: 0.01% or more and 0.50% or less.

The steel sheet according to the present embodiment preferably further contains, in mass %, one or two or more of one or two or more selected from REM: 0.00050% or more and 0.040% or less, Ca: 0.00050% or more and 0.040% or less and Mg: 0.00050% or more and 0.040% or less. When the content of one or two or more of one or two or more selected from REM, Ca and Mg is 0.00050% or more, grain growth is further accelerated. The content of one or two or more of one or two or more selected from REM, Ca and Mg is preferably 0.0010% or more and more preferably 0.0050% or more. On the other hand, when the content of one or two or more of one or two or more selected from REM, Ca and Mg is 0.0400% or less, the deterioration of the magnetic characteristics of the non-oriented electrical steel sheet is further suppressed. The content of one or two or more of one or two or more selected from REM, Ca and Mg is preferably 0.0300% or less and more preferably 0.0200% or less. REM, Ca and Mg are not essential in the steel sheet, and thus the lower limit value of the content thereof is 0%. REM is an abbreviation for rare earth metal and refers to Sc, Y and elements belonging to the lanthanoid series. Industrially, lanthanoids are added in a mischmetal form.

The above-described steel components may be measured by an ordinary analysis method of steel. For example, the steel components may be measured using inductively coupled plasma-atomic emission spectrometry (ICP-AES). C and S may be measured using an infrared absorption method after combustion, N may be measured using an inert gas melting-thermal conductivity method, and O may be measured using an inert gas fusion-nondispersive infrared absorption method.

[Metallographic Structure]

Next, the metallographic structure of the steel sheet according to the present embodiment will be described with reference to FIG. 1. FIG. 1(A) is a schematic view for describing the metallographic structure of the steel sheet according to the present embodiment. FIG. 1(B) is a schematic view for describing the metallographic structure of a comparative material. The steel sheet shown in FIG. 1(A) and the steel sheet shown in FIG. 1(B) have the same chemical composition, but manufacturing conditions are different for the steel sheet shown in FIG. 1(A) and the steel sheet shown in FIG. 1(B).

In FIG. 1, WS indicates one end portion of a hot-rolled steel sheet in the width direction, C indicates the central portion of the hot-rolled steel sheet in the width direction, and DS indicates the other portion of the hot-rolled steel sheet in the width direction. In addition, RD indicates the rolling direction, and ND indicates a normal direction to a rolling surface (sheet thickness direction).

In the metallographic structure of the steel sheet according to the present embodiment, the recrystallization rate of the structure of a sheet thickness-direction cross section at each position 10 mm apart in the sheet width center direction from each of both end portions in the sheet width direction is less than 50%, and, when the sheet width is represented by W, the recrystallization rate of the structure of a sheet thickness-direction cross section at a position of ¼W from each of both end portions in the sheet width direction is 50% or more. Here, W is 800 mm or more. Therefore, the position of ¼W from the end portion in the sheet width direction is positioned on the sheet width center side of the positions 10 mm apart in the sheet width center direction from both end portions in the sheet width direction. Here, the sheet thickness-direction cross section means a cross section parallel to the sheet thickness direction of the steel sheet in the longitudinal direction (or rolling direction).

In the steel sheet according to the present embodiment, as shown in FIG. 1(A), the front and rear surfaces (ND-direction end portions) are recrystallized, and crystal grains are confirmed, but the sheet thickness-direction center extends in the rolling direction, and a deformed structure forming a lamellar shape in the sheet thickness direction is confirmed. On the other hand, in the case of a conventional steel sheet as shown in FIG. 1(B), no deformed structure forming a lamellar shape in the rolling direction is confirmed in the sheet thickness center. Such a recrystallized structure refers to a structure having an aspect ratio of 2.5 or less, and the deformed structure refers to a structure having an aspect ratio of more than 2.5. The aspect ratio can be calculated by measuring the length of the major axis and the length of the minor axis using a scanning electron microscope (SEM).

Ordinarily, when the recrystallization rate of the steel sheet is small, the iron loss of the non-oriented electrical steel sheet which is the final product, becomes large, and the magnetic flux density decreases. In the steel sheet according to the present embodiment, the recrystallization rate of the structure of the sheet thickness-direction cross section at each position 10 mm apart in the sheet width center direction from each of both end portions in the sheet width direction is less than 50%, and a portion from each of both end portions in the sheet width direction to each position 10 mm apart in the sheet width center direction is a portion that has a smaller recrystallization rate and may act as a cause for an increase in the iron loss. However, in the case of manufacturing a non-oriented electrical steel sheet using the steel sheet according to the present embodiment, the above-described portions are cut away in the end, and a residual portion other than the portions becomes the non-oriented electrical steel sheet which is the final product. Therefore, even when the recrystallization rate of the portion from each of both end portions of the steel sheet according to the present embodiment in the sheet width direction to each position 10 mm apart in the sheet width center direction is less than 50%, the portion does not degrade the magnetic characteristics of the non-oriented electrical steel sheet. On the other hand, when the recrystallization rate of the structure of the sheet thickness-direction cross section at each position 10 mm apart in the sheet width center direction from each of both end portions in the sheet width direction is 50% or more, the toughness decreases, the steel sheet is not capable of withstanding stress that is imparted by a bending treatment with a leveler or the like in a pickling process, which is a post process, fractures and the like are initiated, and it becomes impossible to stably thread the steel sheet. The recrystallization rate of the structure of the sheet thickness-direction cross section at each position 10 mm apart in the sheet width center direction from each of both end portions in the sheet width direction is preferably 45% or less and more preferably 40% or less.

On the other hand, when the recrystallization rate of the structure of the sheet thickness-direction cross section at the position of ¼W from each of both end portions in the sheet width direction is 50% or more, the crystal orientation {111} strength, which degrades the magnetic characteristics in the product sheet, decreases. As a result, the iron loss is reduced, and a high magnetic flux density can be obtained. The recrystallization rate of the structure of the sheet thickness-direction cross section at the position of ¼W from each of both end portions in the sheet width direction is preferably 55% or more and more preferably 60% or more.

The recrystallization rate according to the present invention refers to a rate of the area of a portion excluding a deformed structure with respect to the area of the sheet thickness-direction cross section of the steel sheet. The recrystallization rate can be calculated by observing the cross section of the steel sheet before cold rolling (before pickling) using an optical microscope. Specifically, the sheet thickness-direction cross section at each position 10 mm apart toward the sheet width center from each of both end portions of the steel sheet before cold rolling in the sheet width direction is polished using a Nital etchant, and a cross-sectional photograph after the polishing is acquired using an optical microscope. A plurality of straight lines is drawn at 200 μm pitches in the sheet thickness direction and in the rolling direction on the structural photograph, and, with respect to the total number of intersection points of the straight lines in the sheet thickness direction and the straight lines in the rolling direction, the percentage of intersection points on which a recrystallized phase is positioned is regarded as the recrystallization rate.

As described above, according to the steel sheet of the present invention, it is possible to provide a non-oriented electrical steel sheet that satisfies both improvement in hot-rolled sheet toughness and a low iron loss and a high magnetic flux density. The present invention is capable of stably producing and providing, without causing fractures, a non-oriented electrical steel sheet having a low iron loss and a high magnetic flux density, which is desirable as iron core materials for electrical equipment, particularly, iron core materials for rotating machinery, small and medium-sized transformers, electrical components and the like. Therefore, the present invention is capable of sufficiently responding an urgent demand for mass production in the field of the above-described electrical equipment in which a non-oriented electrical steel sheet is used as an iron core material therefor, and the industrial value thereof is extremely high.

<Method for Manufacturing Steel Sheet for Non-Oriented Electrical Steel Sheet>

Next, a method for manufacturing the steel sheet for a non-oriented electrical steel sheet according to the present embodiment (hereinafter, the method for manufacturing the steel sheet for a non-oriented electrical steel sheet will also be simply referred to as the method for manufacturing the steel sheet) will be described. The method for manufacturing the steel sheet according to the present embodiment has a hot rolling process of hot-rolling a slab having the above-described chemical composition, a hot-band annealing process of annealing a steel sheet after the hot rolling process and a cooling process or a heat conservation treatment process instead of the hot-band annealing process. In the method for manufacturing the steel sheet according to the present embodiment, the cooling process is particularly important in order to form the above-described metallographic structure in the steel sheet. Hereinafter, a case where the method for manufacturing the steel sheet according to the present embodiment has a hot rolling and annealing process and a cooling process (first manufacturing method) and a case where the method for manufacturing the steel sheet according to the present embodiment has a heat conservation treatment process and a cooling process (second manufacturing method) will each be described.

In a case where the steel sheet according to the present embodiment is manufactured by the first manufacturing method, the method for manufacturing a non-oriented electrical steel sheet has a hot rolling process of hot-rolling a slab having the above-described chemical composition, a hot-band annealing process of annealing a steel sheet after the hot rolling process, a cooling process, a pickling process, a cold rolling process, a final annealing process and an insulating coating forming process. In addition, in a case where the steel sheet according to the present embodiment is manufactured by the second manufacturing method, the method for manufacturing a non-oriented electrical steel sheet has a hot rolling process of hot-rolling a slab having the above-described chemical composition, a heat conservation treatment process, a cooling process, a pickling process, a cold rolling process, a final annealing process and an insulating coating forming process.

In addition, in the present embodiment, the steel sheet for a non-oriented electrical steel sheet refers to a steel sheet before a pickling process that has undergone a hot-band annealing process or a heat conservation treatment process and then a cooling process. The steel sheet for a non-oriented electrical steel sheet according to the present embodiment can also be referred to as, for example, "the hot-band annealed sheet that is used for a non-oriented electrical steel sheet" in the case of being obtained by the first manufacturing method to be described below. In addition, the steel sheet for a non-oriented electrical steel sheet according to the present embodiment can also be referred to as "the hot-rolled sheet that is used for a non-oriented electrical steel sheet" in the case of being obtained by the second manufacturing method to be described below.

[First Manufacturing Method]

(Hot Rolling Process)

In the hot rolling process, a slab containing the above-described chemical components is hot-rolled to produce a hot-rolled steel sheet. The heating temperature of the slab is 1080° C. or higher and 1200° C. or lower. When the heating temperature of the slab is 1200° C. or lower, the formation of a solid solution or fine precipitation of a sulfide or the like is suppressed, and an increase in the iron loss is suppressed. The upper limit of the heating temperature of the slab is preferably 1180° C. On the other hand, when the heating temperature of the slab is 1080° C. or higher, high hot workability can be obtained. The lower limit of the heating temperature of the slab is preferably 1100° C.

The finishing temperature is 850° C. or higher and 1000° C. or lower. When the finishing temperature is lower than 850° C., the hot workability deteriorates, and the sheet thickness accuracy in the sheet width direction deteriorates. The lower limit of the finishing temperature is preferably 860° C. On the other hand, when the finishing temperature is higher than 1000° C., the recrystallization rate of the hot-rolled steel sheet becomes higher, and the toughness deteriorates. The upper limit of the finishing temperature is preferably 990° C.

(Hot-Band Annealing Process)

In the hot-band annealing process, the steel sheet after the hot rolling process is annealed, and the annealed steel sheet is coiled to produce a coil. The annealing temperature is 900° C. or higher and 950° C. or lower, and the annealing time is 30 seconds or longer and 100 seconds or shorter. When the annealing temperature is lower than 900° C., sufficient recrystallization does not occur, and, in the case of manufacturing an electrical steel sheet using a steel sheet that is not sufficiently recrystallized, crystal grains in the {111} orientation develop and thereby degrading the magnetic characteristics. The lower limit of the annealing temperature is preferably 910° C. On the other hand, when the annealing temperature is higher than 950° C., the recrystallization rate increases, and the effect of a structural control in the cooling process, which is the subsequent process, cannot be sufficiently obtained. The upper limit of the annealing temperature is preferably 940° C.

The annealing atmosphere is not particularly limited and may be an atmosphere in which ordinary hot-band annealing is carried out. The annealing atmosphere needs to be, for example, an inert atmosphere or an oxidative atmosphere and is, specifically, a nitrogen atmosphere, an argon atmosphere, a vacuum atmosphere, the atmosphere, an oxygen atmosphere or the like.

(Cooling Process)

In the cooling process, the hot-band-annealed coil is cooled at a cooling rate of 0.5° C./minute or faster and 2.0° C./minute or slower. In detail, the coil formed by coiling the hot-rolled sheet at a high temperature is cooled from a side surface of the coil (a surface on which the side surface of the hot-band-annealed steel sheet has been laminated) by spraying an air (approximately 15° C. to 20° C.) toward the side surface with, for example, a blower.

In the cooling process, the coil is cooled in a manner that the cooling rate at each position 10 mm apart in the sheet width center direction from each of both end portions in the sheet width direction becomes faster than the cooling rate at each position of ¼W in the sheet width center direction from each of both end portions in the sheet width direction. The cooling rate at each position 10 mm apart in the sheet width center direction from each of both end portions in the sheet width direction is preferably a cooling rate of 0.5° C./minute or faster and 2.0° C./minute or slower. In a case where the cooling rate at each position 10 mm apart in the sheet width center direction from each of both end portions in the sheet width direction is a cooling rate of 0.5° C./minute or faster and 2.0° C./minute or slower, the cooling rate at each position of ¼W in the sheet width center direction from each of both end portions in the sheet width direction is preferably slower than 0.5° C./minute and more preferably 0.4° C./minute or slower. In the cooling process according to the present embodiment, as described above, cooling is carried out by sending an air with a blower to the side surface of the coil formed by coiling the hot-rolled sheet at a high temperature. Therefore, the cooling rate at each position 10 mm apart in the sheet width center direction from each of both end portions in the sheet width direction becomes faster than the cooling rate at each position of ¼W in the sheet width center direction from each of both end portions in the sheet width direction. In a case where the cooling rate is not controlled by an operation such as spraying with a blower, it is difficult to achieve the cooling rate condition of the present application.

As the above-described cooling rate at each position in the sheet width direction, the surface temperature at each position in the sheet width direction is measured. The time during which the air is sprayed to the side surface of the coil with the blower is regarded as the cooling time in the cooling process.

In order to decrease the recrystallization rate, the cooling rate is preferably as fast as possible; however, when the cooling rate is faster than 2.0° C./minute, the recrystallization rate of the structure of the sheet thickness-direction cross section at the position of ¼W from each of both end portions in the sheet width direction decreases, and the magnetic characteristics of a non-oriented electrical steel sheet manufactured using this steel sheet deteriorate. The upper limit of the cooling rate is preferably 1.8° C./minute. On the other hand, when the cooling rate is slower than 0.5° C./minute, an element such as P or Sn is segregated in grain boundaries during cooling, and the toughness deteriorates. The lower limit of the cooling rate is preferably 0.6° C./minute.

The cooling process may be carried out, for example, in the middle of the conveyance of the coil to a pickling device that is used in a pickling process, which is ahead of the cold rolling of the steel sheet, in the method for manufacturing a non-oriented electrical steel sheet. In this case, the coil is preferably conveyed in a state where the axial direction of the coil is substantially horizontal. When the coil is conveyed in a state where the axial direction of the coil is substantially horizontal, at both ends of the coil edge, the cooling rates become almost the same, and almost the same metallographic structures are obtained.

According to the first manufacturing method, since the coil is cooled from the side surface, the cooling rate becomes faster at the end portion of the coil than in the central portion in the width direction, and the amount of heat that is imparted to the end portion of the coil becomes small. As a result, the recrystallization rate of the structure of the sheet thickness-direction cross section at each position 10 mm apart in the sheet width center direction from each of both end portions in the sheet width direction becomes less than 50%. On the other hand, the cooling rate is slow in the coil central portion, and the recrystallization rate of the structure of the sheet thickness-direction cross section at the position of ¼W from each of both end portions in the sheet width direction becomes 50% or more. The first manufacturing method has been described above.

[Second Manufacturing Method]

Subsequently, the second manufacturing method will be described. The second manufacturing method includes a hot rolling process of hot-rolling a slab having the above-described chemical composition and a heat conservation treatment process. The hot rolling process in the second manufacturing method is the same as the hot rolling process in the first manufacturing method and thus will not be described again. Hereinafter, the heat conservation treatment process will be described in detail.

(Heat Conservation Treatment Process)

The heat conservation treatment process is a process of retaining the heat of the steel sheet in a high-temperature state after the hot rolling process. In the heat conservation treatment process, the metallographic structure is controlled using this heat. In the heat conservation treatment process, specifically, a coil formed by coiling the hot-rolled steel sheet is covered with a heat conservation cover that maintains the heat of the coil, thereby retaining the heat of the coil. The coiling method for coiling the steel sheet after the hot rolling process to produce the coil is the same as the coiling method in the hot-band annealing process of the first manufacturing method and thus will not be described again.

The heat conservation temperature, which is the temperature of the coil during heat conservation, is 600° C. or higher and 850° C. or lower. When the heat conservation temperature is higher than 850° C., the recrystallization rate at the side surface of the coil increases. The upper limit of the heat conservation temperature is preferably 840° C. On the other hand, when the heat conservation temperature is lower than 600° C., the central portion of the coil in the width direction (sheet width direction) is not sufficiently recrystallized, and the iron loss increases and thereby decreasing the magnetic flux density. The lower limit of the heat conservation temperature is preferably 650° C. or higher and more preferably 700° C. or higher. The time from putting the above-described cover on the coil to removing it is regarded as the heat conservation time in the heat conservation treatment process. The heat conservation time is preferably one minute to two hours.

In a case where the heat conservation temperature is high, the heat conservation treatment process may be carried out without the cover. In this case, the heat conservation treatment process begins at a point in time where the hot-rolled steel sheet is coiled to form the coil and ends at a point in time where the temperature of the coil begins to decrease. The point in time where the coil is formed is a point in time where the coiling of a single strip of the hot-rolled steel sheet into a single turn of a coil is completed. In addition, the point in time where the temperature of the coil begins to decrease is a point in time where the cooling rate of the coil changes, in other words, the inflection point of the cooling rate curve. Depending on the heat conservation temperature, there are cases where a change in the temperature of the coil is extremely small for a predetermined period of time from the point in time where the coiling of the coil is completed, and, once the predetermined period of time elapses, the temperature of the coil begins to rapidly decrease.

In a case where the slab that is used for the manufacturing of the steel sheet contains one or two or more selected from the group consisting of Sn: 0.01% or more and 0.50% or less, Sb: 0.01% or more and 0.50% or less and Cu: 0.01% or more and 0.50% or less, since these elements contribute to a decrease in the iron loss and an increase in the magnetic flux density, it is possible to decrease the heat conservation temperature, and thus the toughness of the steel sheet can be further improved. Therefore, in a case where the slab contains one or two or more selected from the group consisting of Sn: 0.01% or more and 0.50% or less, Sb: 0.01% or more and 0.50% or less and Cu: 0.01% or more and 0.50% or less, it becomes possible to more highly satisfy both appropriate toughness and a decrease in the iron loss and an increase in the magnetic flux density by setting the temperature of the heat conservation treatment process to 850° C. or lower.

It is needless to say that, even in a case where the slab contains one or two or more selected from the group consisting of Sn: 0.01% or more and 0.50% or less, Sb: 0.01% or more and 0.50% or less and Cu: 0.01% or more and 0.50% or less, when the heating temperature or the finishing temperature in the hot rolling process is increased, the recrystallization rate increases, and the magnetic characteristics improve, but there are cases where the toughness deteriorates. In such cases, the recrystallization rate can be adjusted by, for example, controlling the coiling temperature.

The mechanism for a decrease in the iron loss and an increase in the magnetic flux density when the slab contains one or two or more selected from the group consisting of Sn: 0.01% or more and 0.50% or less, Sb: 0.01% or more and 0.50% or less and Cu: 0.01% or more and 0.50% or less is not clear, but is considered that these elements suppress the growth of {111} orientation grains that adversely affect the magnetic characteristics.

The heat conservation time, which is the time during which the temperature of the coil is retained at the above-described temperature, is preferably one minute or longer from the viewpoint of recrystallization. The lower limit of the heat conservation time is more preferably 15 minutes. On the other hand, when the heat conservation time is longer than two hours, the recrystallization rate in the vicinity of the side surface of the coil increases, and cracks are likely to be initiated in the pickling process or the cold rolling process in the manufacturing of a non-oriented electrical steel sheet. Therefore, the heat conservation time is preferably two hours or shorter. The heat conservation time is more preferably 1.5 hours or shorter.

The heat conservation atmosphere is not particularly limited, and the heat of the coil may be retained in an atmosphere in which ordinary hot-band annealing is carried out. The heat conservation atmosphere needs to be, for example, an inert atmosphere or an oxidative atmosphere and is, specifically, a nitrogen atmosphere, an argon atmosphere, a vacuum atmosphere, the atmosphere, an oxygen atmosphere or the like.

When the steel sheet undergoes the above-described heat conservation treatment process, elements are segregated in grain boundaries, and the recrystallization of the {111} orientation grains, which appear from the grain boundaries after hot rolling and annealing, is suppressed, which are the effects of the heat conservation treatment. Therefore, a non-oriented electrical steel sheet manufactured by the second manufacturing method having the heat conservation treatment process is excellent in terms of the magnetic characteristics compared with the non-oriented electrical steel sheet manufactured by the first manufacturing method having the annealing process.

(Cooling Process)

In the cooling process, the coil that has undergone the heat conservation treatment process is cooled at a cooling rate of 0.5° C./minute or faster and 2.0° C./minute or slower. In detail, the coil that has undergone the heat conservation treatment process is cooled from a side surface of the coil (a surface on which the side surface of the steel sheet after the heat conservation treatment process has been laminated) by spraying an air (approximately 15° C. to 20° C.) toward the side surface with, for example, a blower.

In the cooling process, the coil is cooled in a manner that the cooling rate at each position 10 mm apart in the sheet width center direction from each of both end portions in the sheet width direction becomes faster than the cooling rate at each position of ¼W in the sheet width center direction from each of both end portions in the sheet width direction. The cooling rate at each position 10 mm apart in the sheet width center direction from each of both end portions in the sheet width direction is preferably a cooling rate of 0.5° C./minute or faster and 2.0° C./minute or slower. In a case where the cooling rate at each position 10 mm apart in the sheet width center direction from each of both end portions in the sheet width direction is a cooling rate of 0.5° C./minute or faster and 2.0° C./minute or slower, the cooling rate at each position of ¼W in the sheet width center direction from each of both end portions in the sheet width direction is preferably slower than 0.5° C./minute and more preferably 0.4° C./minute or slower. In the cooling process according to the present embodiment, as described above, cooling is carried out by sending an air with a blower to the side surface of the coil formed by coiling the hot-rolled sheet at a high temperature. Therefore, the cooling rate at each position 10 mm apart in the sheet width center direction from each of both end portions in the sheet width direction becomes faster than the cooling rate at each position of ¼W in the sheet width center direction from each of both end portions in the sheet width direction.

As the above-described cooling rate at each position in the sheet width direction, the surface temperature at each position in the sheet width direction is measured. The time during which the air is sprayed to the side surface of the coil with the blower is regarded as the cooling time in the cooling process.

In order to decrease the recrystallization rate, the cooling rate is preferably as fast as possible: however, when the cooling rate is faster than 2.0° C./minute, the recrystallization rate of the structure of the sheet thickness-direction cross section at the position of ¼W from each of both end portions in the sheet width direction decreases, and the magnetic characteristics of a non-oriented electrical steel sheet manufactured using this steel sheet deteriorate. The upper limit of the cooling rate is preferably 1.8° C./minute. On the other hand, when the cooling rate is slower than 0.5° C./minute, an element such as P or Sn is segregated in grain boundaries during cooling, and the toughness deteriorates. The lower limit of the cooling rate is preferably 0.6° C./minute.

The cooling process may be carried out, for example, in the middle of the conveyance of the coil to a pickling device that is used in a pickling process, which is ahead of the cold rolling of the steel sheet, in the method for manufacturing a non-oriented electrical steel sheet. In this case, the coil is preferably conveyed in a state where the axial direction of the coil is substantially horizontal. When the coil is conveyed in a state where the axial direction of the coil is substantially horizontal, at both ends of the coil edge, the cooling rates become almost the same, and almost the same metallographic structures are obtained.

The cooling process is more preferably initiated immediately after the above-described cover is removed. Alternately, the cooling process is more preferably initiated before the point in time where the temperature of the coil begins to decrease.

According to the second manufacturing method, similar to the first manufacturing method, since the coil is cooled from the side surface, the cooling rate becomes faster at the end portion of the coil than in the central portion in the width direction, and the amount of heat that is imparted to the end portion of the coil becomes small. As a result, the recrystallization rate of the structure of the sheet thickness-direction cross section at each position 10 mm apart in the sheet width center direction from each of both end portions in the sheet width direction becomes less than 50%. On the other hand, the cooling rate is slow in the coil central portion, and the recrystallization rate of the structure of the sheet thickness-direction cross section at the position of ¼W from each of both end portions in the sheet width direction becomes 50% or more. The second manufacturing method is a manufacturing method from which the hot-band annealing process can be skipped and is thus a more preferable method for manufacturing the steel sheet than the first manufacturing method. The second manufacturing method has been described above.

In any of the first manufacturing method and the second manufacturing method, a high-temperature finishing treatment may be carried out on the steel sheet after the hot rolling process in order to control the crystal grain diameters to be enough to suppress an increase in the iron loss. The high-temperature finishing treatment is, for example, a treatment for recrystallizing hot-rolled sheets.

EXAMPLES

Next, examples of the present invention will be described. Conditions in the present examples are condition examples adopted to confirm the feasibility and effects of the present invention, and the present invention is not limited to these examples. The present invention is capable of adopting a variety of conditions within the scope of the gist of the present invention as long as the objective of the present invention is achieved.

Example 1

Steels having chemical components shown in Table 1 were cast and hot-rolled under conditions shown in Tables 2 and 3, thereby producing hot-rolled sheets having a sheet thickness of 2.0 mm and a sheet width of 1000 mm. After that, a heat treatment (hot-band annealing process) was carried out for one second to 100 seconds at a hot-band annealing temperature shown in Table 2 (atmosphere: 100% of nitrogen) or a heat conservation treatment process shown in Table 3 was carried out thereon, and the sheets were cooled at a cooling rate shown in Tables 2 and 3, thereby manufacturing steel sheets. The REM content is the total amount of one or two or more selected from the group consisting of Sc, Y and rare earth elements.

The cooling process was carried out using a blower. Regarding the cooling rate at each position 10 mm apart in the sheet width center direction from each of both end portions in the sheet width direction and the cooling rate at each position of ¼W in the sheet width center direction from each of both end portions in the sheet width direction, surface temperatures were measured.

TABLE 1

| | Steel No. | Chemical components (mass %) (remainder is Fe and impurities) | | | | | | | | A group elements | | | B group elements | | |
|---|---|---|---|---|---|---|---|---|---|---|---|---|---|---|---|
| | | C | Si | Mn | P | S | Al | B | N | Sn | Sb | Cu | REM | Ca | Mg |
| Invention Example | A1 | 0.0040 | 2.3 | 0.5 | 0.01 | 0.004 | 2.4 | 0.0051 | 0.0033 | — | — | — | — | — | — |
| | A2 | 0.0033 | 1.9 | 0.4 | 0.04 | 0.002 | 2.9 | 0.0011 | 0.0019 | — | — | — | — | — | — |
| | A3 | 0.0036 | 3.5 | 0.3 | 0.07 | 0.001 | 1.0 | 0.0013 | 0.0029 | — | — | — | — | — | — |
| | A4 | 0.0024 | 3.1 | 0.1 | 0.05 | 0.002 | 1.6 | 0.0034 | 0.0021 | — | — | — | — | — | — |
| | A5 | 0.0028 | 3.1 | 2.0 | 0.04 | 0.004 | 0.4 | 0.0022 | 0.0018 | — | — | — | — | — | — |
| | A6 | 0.0012 | 2.9 | 1.2 | 0.09 | 0.002 | 1.2 | 0.0011 | 0.0018 | — | — | — | — | — | — |
| | A7 | 0.0035 | 2.8 | 1.0 | 0.01 | 0.005 | 1.4 | 0.0019 | 0.0012 | — | — | — | — | — | — |
| | A8 | 0.0028 | 2.9 | 1.9 | 0.05 | 0.004 | 0.1 | 0.0045 | 0.0029 | — | — | — | — | — | — |
| | A9 | 0.0011 | 2.5 | 0.5 | 0.04 | 0.005 | 3.0 | 0.0023 | 0.0021 | — | — | — | — | — | — |
| | A10 | 0.0038 | 2.4 | 0.2 | 0.08 | 0.001 | 2.4 | 0.0060 | 0.0035 | — | — | — | — | — | — |
| | A11 | 0.0023 | 2.3 | 0.3 | 0.01 | 0.002 | 2.5 | 0.0055 | 0.0040 | — | — | — | — | — | — |
| | A12 | 0.0026 | 2.3 | 0.5 | 0.04 | 0.003 | 2.4 | 0.0013 | 0.0012 | 0.02 | — | — | — | — | — |
| | A13 | 0.0014 | 2.2 | 0.2 | 0.08 | 0.002 | 2.7 | 0.0018 | 0.0027 | — | 0.04 | — | — | — | — |
| | A14 | 0.0036 | 2.1 | 0.5 | 0.07 | 0.002 | 2.6 | 0.0014 | 0.0018 | — | — | 0.03 | — | — | — |
| | A15 | 0.0029 | 2.0 | 0.2 | 0.02 | 0.003 | 2.9 | 0.0022 | 0.0032 | — | — | — | 0.002 | — | — |
| | A16 | 0.0018 | 2.3 | 0.2 | 0.04 | 0.002 | 2.6 | 0.0013 | 0.0034 | — | — | — | — | 0.0009 | — |
| | A17 | 0.0021 | 2.4 | 0.3 | 0.03 | 0.004 | 2.4 | 0.0032 | 0.0012 | — | — | — | — | — | 0.0008 |
| | A18 | 0.0010 | 3.1 | 0.3 | 0.04 | 0.002 | 1.5 | 0.0023 | 0.0023 | 0.03 | 0.02 | — | — | — | — |
| | A19 | 0.0034 | 3.2 | 0.6 | 0.04 | 0.003 | 1.2 | 0.0011 | 0.0021 | 0.02 | — | 0.02 | — | — | — |
| | A20 | 0.0026 | 2.9 | 0.2 | 0.06 | 0.002 | 1.8 | 0.0018 | 0.0014 | 0.02 | — | — | 0.003 | — | — |
| | A21 | 0.0038 | 2.8 | 0.8 | 0.08 | 0.001 | 1.6 | 0.0024 | 0.0032 | 0.04 | — | — | 0.002 | 0.0012 | — |
| | A22 | 0.0013 | 2.9 | 1.1 | 0.04 | 0.004 | 1.2 | 0.0022 | 0.0021 | 0.03 | — | — | — | 0.0023 | 0.0009 |
| | A23 | 0.0029 | 2.7 | 0.3 | 0.02 | 0.003 | 2.0 | 0.0034 | 0.0031 | — | — | 0.04 | — | 0.0015 | — |
| | A24 | 0.0010 | 2.6 | 0.4 | 0.05 | 0.002 | 2.1 | 0.0045 | 0.0029 | — | — | 0.02 | 0.005 | — | 0.0014 |
| | A25 | 0.0026 | 2.5 | 0.2 | 0.02 | 0.001 | 2.3 | 0.0021 | 0.0026 | — | 0.03 | — | — | 0.0021 | — |
| Compar-ative Example | a1 | 0.0080 | 2.1 | 0.2 | 0.08 | 0.004 | 2.8 | 0.0055 | 0.0019 | — | — | — | — | 0.0101 | — |
| | a2 | 0.0037 | 1.1 | 1.5 | 0.06 | 0.002 | 3.2 | 0.0023 | 0.0024 | — | 0.19 | 0.22 | — | — | — |
| | a3 | 0.0028 | 4.2 | 0.2 | 0.05 | 0.003 | 0.2 | 0.0011 | 0.0023 | — | — | — | — | — | 0.0087 |
| | a4 | 0.0023 | 2.3 | 0.07 | 0.03 | 0.001 | 2.7 | 0.0018 | 0.0026 | 0.38 | — | — | — | — | — |
| | a5 | 0.0017 | 3.1 | 2.5 | 0.04 | 0.002 | 0.1 | 0.0011 | 0.0011 | — | — | — | — | — | — |
| | a6 | 0.0039 | 3.4 | 1.1 | 0.11 | 0.003 | 0.6 | 0.0025 | 0.0032 | — | — | — | 0.0033 | 0.0056 | — |
| | a7 | 0.0032 | 3.1 | 1.5 | 0.06 | 0.008 | 0.7 | 0.0055 | 0.0037 | — | — | — | — | — | — |
| | a8 | 0.0028 | 3.1 | 1.7 | 0.05 | 0.003 | 0.05 | 0.0028 | 0.0011 | — | — | — | — | — | — |
| | a9 | 0.0015 | 1.9 | 1.1 | 0.08 | 0.005 | 3.2 | 0.0019 | 0.0017 | — | — | — | — | 0.0034 | 0.0025 |
| | a10 | 0.0019 | 2.3 | 2.1 | 0.07 | 0.004 | 1.3 | 0.0072 | 0.0032 | — | — | — | — | — | — |
| | a11 | 0.0032 | 2.5 | 1.0 | 0.07 | 0.003 | 1.8 | 0.0033 | 0.0052 | — | — | — | 0.0056 | — | — |

TABLE 2

| Manu-facturing method No. | Hot rolling process: Slab heating temperature (° C.) | Hot rolling process: Finishing temperature (° C.) | Hot-band annealing process: Annealing temperature (° C.) | Hot-band annealing process: Annealing time (sec) | Cooling process: Cooling rate at position 10 mm apart from end portion (° C./min) | Cooling process: Cooling rate at position of ¼ W from end portion (° C./min) |
|---|---|---|---|---|---|---|
| B1 | 1080 | 900 | 920 | 90 | 1.5 | 0.3 |
| B2 | 1200 | 930 | 950 | 70 | 1.8 | 0.2 |
| B3 | 1090 | 850 | 930 | 90 | 1.7 | 0.1 |
| B4 | 1100 | 1000 | 940 | 50 | 0.6 | 0.2 |
| B5 | 1100 | 990 | 900 | 60 | 0.8 | 0.1 |
| B6 | 1080 | 950 | 950 | 70 | 1.8 | 0.3 |
| B7 | 1070 | 880 | 940 | 30 | 1.5 | 0.1 |
| B8 | 1190 | 920 | 930 | 100 | 1.6 | 0.1 |
| B9 | 1190 | 880 | 940 | 90 | 0.5 | 0.2 |
| B10 | 1050 | 990 | 920 | 80 | 2.0 | 0.1 |
| B11 | 1070 | 920 | 940 | 80 | 1.8 | 0.2 |
| B12 | 1090 | 950 | 940 | 70 | 1.6 | 0.1 |
| b1 | 1250 | 990 | 940 | 70 | 1.9 | 0.1 |
| b2 | 1100 | 1100 | 930 | 60 | 1.5 | 0.1 |
| b3 | 1150 | 980 | 1100 | 90 | 1.8 | 0.2 |
| b4 | 1180 | 880 | 930 | 150 | 1.9 | 0.5 |
| b5 | 1170 | 920 | 920 | 90 | 2.5 | 0.1 |
| b6 | 1100 | 920 | 920 | 60 | 0.2 | 0.1 |

TABLE 2-continued

| Manu-facturing method No. | Hot rolling process: Slab heating temperature (° C.) | Hot rolling process: Finishing temperature (° C.) | Hot-band annealing process: Annealing temperature (° C.) | Hot-band annealing process: Annealing time (sec) | Cooling process: Cooling rate at position 10 mm apart from end portion (° C./min) | Cooling process: Cooling rate at position of ¼ W from end portion (° C./min) |
|---|---|---|---|---|---|---|
| b7 | 1090 | 980 | 880 | 50 | 1.4 | 0.3 |
| b8 | 1080 | 880 | 930 | 20 | 1.8 | 0.1 |
| b9 | 1050 | 900 | 920 | 90 | 1.9 | 0.2 |
| b10 | 1100 | 840 | 910 | 80 | 2.0 | 0.3 |

TABLE 3

| Manu-facturing method No. | Hot rolling process: Slab heating temperature (° C.) | Hot rolling process: Finishing temperature (° C.) | Coil heat conservation treatment process: Heat conservation temperature (° C.) | Coil heat conservation treatment process: Heat conservation time (min) | Cooling process: Cooling rate at position 10 mm apart from end portion (° C./min) | Cooling process: Cooling rate at position of ¼ W from end portion (° C./min) |
|---|---|---|---|---|---|---|
| C1 | 1080 | 900 | 650 | 60 | 1.2 | 0.1 |
| C2 | 1200 | 950 | 700 | 100 | 1.4 | 0.1 |
| C3 | 1090 | 850 | 750 | 8 | 1.3 | 0.2 |
| C4 | 1100 | 1000 | 780 | 15 | 1.6 | 0.2 |
| C5 | 1190 | 880 | 600 | 80 | 1.8 | 0.3 |
| C6 | 1180 | 900 | 850 | 5 | 1.7 | 0.2 |
| C7 | 1160 | 920 | 830 | 1 | 0.9 | 0.1 |
| C8 | 1090 | 890 | 800 | 120 | 1.3 | 0.1 |
| C9 | 1110 | 920 | 810 | 40 | 0.8 | 0.2 |
| C10 | 1130 | 990 | 770 | 80 | 1.8 | 0.1 |
| c1 | 1190 | 870 | 550 | 120 | 1.5 | 0.1 |
| c2 | 1160 | 990 | 900 | 100 | 1.1 | 0.2 |
| c3 | 1180 | 990 | 750 | 0.5 | 1.3 | 0.1 |
| c4 | 1190 | 940 | 750 | 200 | 1.8 | 0.1 |
| c5 | 1090 | 920 | 750 | 15 | 2.1 | 0.2 |
| c6 | 1110 | 950 | 780 | 20 | 0.4 | 0.1 |
| c7 | 1050 | 980 | 740 | 100 | 1.5 | 0.4 |
| c8 | 1250 | 880 | 690 | 90 | 1.4 | 0.1 |
| c9 | 1090 | 1100 | 800 | 60 | 1.2 | 0.5 |
| c10 | 1150 | 820 | 700 | 80 | 1.7 | 0.1 |

For each of the steel sheets manufactured under the individual conditions, the recrystallization rate of the structure of a sheet thickness-direction cross section at each position 10 mm apart toward the sheet width center from each of both end portions in the sheet width direction and the recrystallization rate of the structure of a sheet thickness-direction cross section at a position 500 mm apart from each of both end portions in the sheet width direction were measured. The recrystallization rates were calculated by the following method. First, the sheet thickness-direction cross section at each position described above was polished using alumina and etched with a Nital etchant, and then a cross-sectional photograph after the etching was acquired using an optical microscope. In addition, a plurality of straight lines was drawn at 200 μm pitches in the sheet thickness direction and in the rolling direction on the structural photograph, and, with respect to the total number of intersection points of the straight lines in the sheet thickness direction and the straight lines in the rolling direction, the percentage of intersection points on which a recrystallized phase is positioned was regarded as the recrystallization rate.

In addition, the toughness of the manufactured steel sheets was evaluated by the following method. A Charpy impact test was carried out according to JIS Z 2242:2018, and the percent ductile fracture of the fractured surface was confirmed. In addition, in a case where the ductile brittle transition temperature (DBTT) was 0° C. or lower, the evaluation result was regarded as favorable (A), and, in a case where DBTT was 0° C. or higher, the evaluation result was regarded as poor (B).

In addition, the manufactured steel sheets were pickled by being immersing in hydrochloric acid (85° C., 7.5 mass %) for 30 seconds. After that, cold rolling was carried out at a cold rolling reduction of 75% until the thickness reached 0.3 mm, and final annealing was carried out at 1050° C. for 30 seconds.

A 55 mm×55 mm specimen was collected from each of the final-annealed steel sheets, and $W_{15/50}$ (the iron loss at the time of magnetizing the steel sheet to a magnetic flux density of 1.5 T at 50 Hz) was measured with a single sheet tester (SST) according to JIS C 2556: 2015.

For examples in which $W_{15/50}$ was less than 2.60 W/kg, the evaluation results were determined to be favorable (A), and, for examples in which $W_{15/50}$ was 2.60 W/kg or more, the evaluation results were determined to be poor (B).

As the magnetic flux density, B50 (T), which is a value of the magnetic flux density at the time of imparting a magnetizing force of 5000 A/m, was measured. For examples in which B50 was 1.60 T or more, the evaluation results were determined to be favorable (A), and, for examples in which B50 was less than 1.60 T, the evaluation results were determined to be poor (B).

Figure 2:
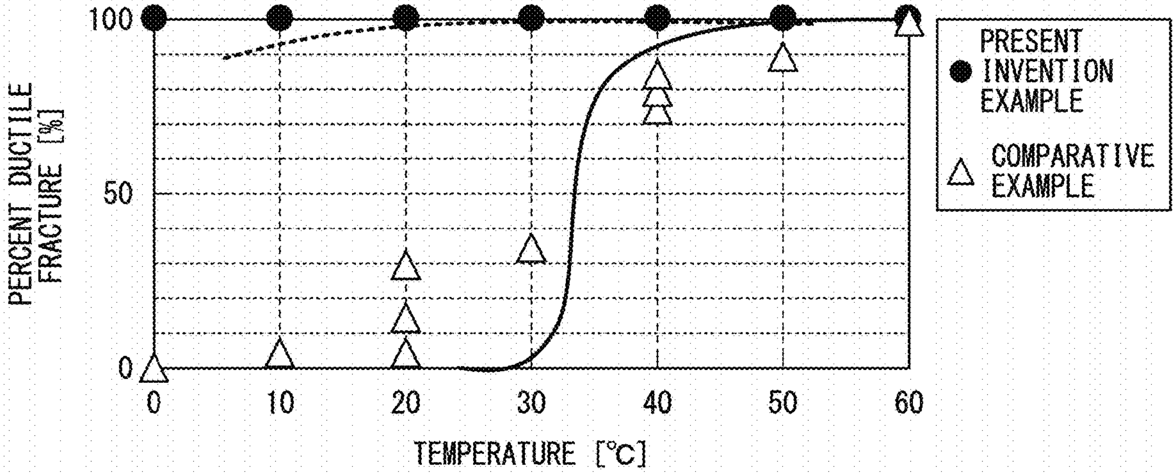
FIG. 2 is a graph showing the results of a Charpy test in examples.

The recrystallization rates, the toughness and the magnetic flux densities are shown in Table 4 and Table 5, and the results of the Charpy test are shown in FIG. 2.

TABLE 4

| | | | | Recrystallization rate (%) | | | | Hot-rolled steel sheet | | Non-oriented electrical steel sheet | | | |
|---|---|---|---|---|---|---|---|---|---|---|---|---|---|
| | | | | Steel sheet DS portion | | Steel sheet WS portion | | DBTT | | Iron loss | | Magnetic flux density | |
| | No. | Steel No. | Manufacturing method No. | Position 10 mm apart from end portion | Position of ¼ W from end portion | Position 10 mm apart from end portion | Position of ¼ W from end portion | (° C.) | Evaluation result | (W/kg) | Evaluation result | (T) | Evaluation result |
| Invention Example | D1 | A1 | B1 | 15 | 89 | 18 | 72 | −10 | A | 2.55 | A | 1.66 | A |
| | D2 | A2 | B2 | 18 | 82 | 18 | 79 | −12 | A | 2.56 | A | 1.67 | A |
| | D3 | A3 | B3 | 20 | 86 | 19 | 82 | −11 | A | 2.57 | A | 1.67 | A |
| | D4 | A4 | B4 | 18 | 78 | 29 | 85 | −8 | A | 2.55 | A | 1.66 | A |
| | D5 | A5 | B5 | 40 | 76 | 27 | 84 | −5 | A | 2.58 | A | 1.67 | A |
| | D6 | A6 | B6 | 30 | 72 | 28 | 80 | −12 | A | 2.59 | A | 1.65 | A |
| | D7 | A7 | B7 | 21 | 70 | 26 | 82 | −13 | A | 2.53 | A | 1.66 | A |
| | D8 | A8 | B8 | 40 | 78 | 29 | 84 | −19 | A | 2.54 | A | 1.67 | A |
| | D9 | A9 | B9 | 30 | 76 | 39 | 86 | −3 | A | 2.55 | A | 1.66 | A |
| | D10 | A10 | B10 | 45 | 74 | 37 | 83 | −12 | A | 2.54 | A | 1.65 | A |
| | D11 | A11 | B11 | 35 | 79 | 35 | 89 | −11 | A | 2.55 | A | 1.66 | A |
| | D12 | A12 | B12 | 30 | 81 | 39 | 83 | −1 | A | 2.58 | A | 1.66 | A |
| | D13 | A13 | B10 | 35 | 84 | 41 | 87 | −3 | A | 2.55 | A | 1.65 | A |
| | D14 | A14 | B11 | 44 | 84 | 43 | 89 | −9 | A | 2.48 | A | 1.69 | A |
| | D15 | A15 | B12 | 23 | 82 | 45 | 72 | −10 | A | 2.48 | A | 1.69 | A |
| | D16 | A1 | C1 | 33 | 87 | 38 | 74 | −11 | A | 2.55 | A | 1.66 | A |
| | D17 | A2 | C2 | 25 | 74 | 30 | 79 | −10 | A | 2.56 | A | 1.66 | A |
| | D18 | A3 | C3 | 29 | 70 | 36 | 81 | −2 | A | 2.55 | A | 1.66 | A |
| | D19 | A4 | C4 | 25 | 74 | 32 | 79 | −5 | A | 2.53 | A | 1.66 | A |
| | D20 | A5 | C5 | 45 | 72 | 29 | 74 | −10 | A | 2.55 | A | 1.66 | A |
| | D21 | A16 | C6 | 40 | 79 | 27 | 87 | −10 | A | 2.58 | A | 1.66 | A |
| | D22 | A17 | C7 | 35 | 73 | 29 | 80 | −13 | A | 2.58 | A | 1.66 | A |
| | D23 | A18 | C8 | 36 | 76 | 25 | 82 | −9 | A | 2.57 | A | 1.66 | A |
| | D24 | A19 | C9 | 49 | 74 | 27 | 91 | −19 | A | 2.55 | A | 1.69 | A |
| | D25 | A20 | C10 | 30 | 79 | 25 | 87 | −20 | A | 2.58 | A | 1.69 | A |
| | D26 | A21 | C1 | 40 | 75 | 33 | 84 | −11 | A | 2.58 | A | 1.66 | A |
| | D27 | A22 | C2 | 33 | 78 | 37 | 87 | −25 | A | 2.58 | A | 1.66 | A |
| | D28 | A23 | C3 | 36 | 79 | 38 | 91 | −10 | A | 2.57 | A | 1.67 | A |
| | D29 | A24 | C4 | 41 | 81 | 39 | 79 | −12 | A | 2.56 | A | 1.66 | A |
| | D30 | A25 | C5 | 39 | 80 | 37 | 78 | −8 | A | 2.57 | A | 1.67 | A |
| | D31 | A9 | b9 | 42 | 85 | 44 | 79 | −9 | A | 2.56 | A | 1.61 | A |
| | D32 | A10 | b10 | 45 | 89 | 44 | 78 | −1 | A | 2.57 | A | 1.62 | A |
| | D33 | A2 | c7 | 46 | 82 | 45 | 82 | −1 | A | 2.58 | A | 1.60 | A |
| | D34 | A5 | c10 | 48 | 85 | 48 | 82 | −9 | A | 2.58 | A | 1.61 | A |

TABLE 5

| | | | | Recrystallization rate (%) | | | | Hot-rolled steel sheet | | Non-oriented electrical steel sheet | | | |
|---|---|---|---|---|---|---|---|---|---|---|---|---|---|
| | | | | Steel sheet DS portion | | Steel sheet WS portion | | DBTT | | Iron loss | | Magnetic flux density | |
| | No. | Steel No. | Manufacturing method No. | Position 10 mm apart from end portion | Position of ¼ W from end portion | Position 10 mm apart from end portion | Position of ¼ W from end portion | (° C.) | Evaluation result | (W/kg) | Evaluation result | (T) | Evaluation result |
| Comparative Example | d1 | a1 | b1 | 87 | 84 | 87 | 83 | 15 | B | 2.77 | B | 1.52 | B |
| | d2 | a2 | b2 | 82 | 87 | 88 | 89 | 12 | B | 2.78 | B | 1.54 | B |
| | d3 | a3 | b3 | 88 | 89 | 89 | 83 | 19 | B | 2.77 | B | 1.52 | B |
| | d4 | a4 | b4 | 89 | 88 | 81 | 83 | 20 | B | 2.72 | B | 1.55 | B |
| | d5 | a5 | b5 | 91 | 89 | 82 | 84 | 25 | B | 2.76 | B | 1.54 | B |
| | d6 | a6 | b4 | 92 | 92 | 85 | 85 | 19 | B | 2.79 | B | 1.52 | B |
| | d7 | a7 | b5 | 89 | 85 | 89 | 85 | 20 | B | 2.72 | B | 1.53 | B |
| | d8 | a8 | c1 | 82 | 84 | 88 | 89 | 18 | B | 2.71 | B | 1.54 | B |
| | d9 | a9 | c2 | 85 | 82 | 83 | 82 | 18 | B | 2.69 | B | 1.55 | B |
| | d10 | a10 | c3 | 87 | 84 | 84 | 83 | 16 | B | 2.79 | B | 1.53 | B |

TABLE 5-continued

| No. | Steel No. | Manufacturing method No. | Recrystallization rate (%) Steel sheet DS portion Position 10 mm apart from end portion | Steel sheet DS portion Position of ¼ W from end portion | Steel sheet WS portion Position 10 mm apart from end portion | Steel sheet WS portion Position of ¼ W from end portion | Hot-rolled steel sheet DBTT (° C.) | Hot-rolled steel sheet DBTT Evaluation result | Non-oriented electrical steel sheet Iron loss (W/kg) | Iron loss Evaluation result | Magnetic flux density (T) | Magnetic flux density Evaluation result |
|---|---|---|---|---|---|---|---|---|---|---|---|---|
| d11 | a11 | c4 | 88 | 85 | 86 | 84 | 18 | B | 2.76 | B | 1.56 | B |
| d12 | a1 | b6 | 80 | 85 | 80 | 84 | 10 | B | 2.72 | B | 1.58 | B |
| d13 | a2 | c5 | 92 | 90 | 92 | 90 | 14 | B | 2.75 | B | 1.58 | B |
| d14 | a3 | c6 | 91 | 90 | 91 | 90 | 15 | B | 2.72 | B | 1.56 | B |
| d15 | a4 | B1 | 75 | 90 | 74 | 90 | 14 | B | 2.76 | B | 1.59 | B |
| d16 | a5 | B2 | 79 | 80 | 80 | 81 | 11 | B | 2.74 | B | 1.56 | B |
| d17 | a6 | C1 | 81 | 83 | 76 | 83 | 16 | B | 2.79 | B | 1.53 | B |
| d18 | a7 | C2 | 82 | 88 | 80 | 85 | 18 | B | 2.77 | B | 1.52 | B |
| d19 | A3 | b3 | 55 | 82 | 53 | 82 | 5 | B | 2.59 | A | 1.63 | A |
| d20 | A4 | b4 | 54 | 83 | 61 | 85 | 3 | B | 2.58 | A | 1.62 | A |
| d21 | A6 | b6 | 52 | 82 | 55 | 84 | 3 | B | 2.56 | A | 1.61 | A |
| d22 | A12 | c2 | 53 | 80 | 52 | 70 | 3 | B | 2.58 | A | 1.62 | A |
| d23 | A14 | c4 | 52 | 80 | 52 | 71 | 3 | B | 2.57 | A | 1.61 | A |
| d24 | A1 | c6 | 52 | 80 | 52 | 71 | 3 | B | 2.58 | A | 1.60 | A |

As shown in Table 4 and Table 5, for the steel sheets containing, in mass %, C: 0.0040% or less, Si: 1.9% or more and 3.5% or less, Al: 0.10% or more and 3.0% or less, Mn: 0.10% or more and 2.0% or less, P: 0.09% or less, S: 0.005% or less, N: 0.0040% or less, B: 0.0060% or less, and the remainder comprising Fe and impurities, in which the recrystallization rate of the structure of the sheet thickness-direction cross section at each position 10 mm apart toward the sheet width center from each of both end portions in the sheet width direction was less than 50%, and, when the sheet width was represented by W, the recrystallization rate of the structure of the sheet thickness-direction cross section at the position of ¼W from each of both end portions in the sheet width direction was 50% or more, the hot-rolled sheet toughness was favorable, and the magnetic characteristics after cold rolling and annealing were favorable. Steel sheets D31 to D34 had favorable hot-rolled sheet toughness and favorable magnetic characteristics after cold rolling and annealing, but some of them were not hot-rolled as desired. This is considered to be because the conditions for the hot rolling process were not preferable.

In addition, as is clear from FIG. 2, in present invention examples, the percent ductile fracture was high even at 0° C.: however, in comparative examples, the temperatures at which the percent ductile fracture began to increase was higher than 0° C. In the present invention examples, the hot-rolled sheet toughness was favorable.

INDUSTRIAL APPLICABILITY

According to the present invention, it is possible to provide a steel sheet for a non-oriented electrical steel sheet satisfying both hot-rolled sheet toughness and magnetic characteristics after cold rolling and annealing, and thus the present invention is highly useful industrially.

What is claimed is:

1. A steel sheet for a non-oriented electrical steel sheet comprising, in mass %:

C: 0.0040% or less;
Si: 1.9% or more and 3.5% or less;
Al: 0.10% or more and 3.0% or less;
Mn: 0.10% or more and 2.0% or less;
P: 0.09% or less;
S: 0.005% or less;
N: 0.0040% or less;
B: 0.0060% or less; and
a remainder comprising Fe and impurities,
wherein a recrystallization rate of a structure of a sheet thickness-direction cross section at each position 10 mm apart toward a sheet width center from each of both end portions in a sheet width direction is less than 50%, and,
when a sheet width is represented by W in mm and W is 800 mm or more, a recrystallization rate of a structure of a sheet thickness-direction cross section at a position of ¼W from each of both end portions in the sheet width direction is 50% or more.

2. The steel sheet for a non-oriented electrical steel sheet according to claim 1, further comprising, in mass %, one or more of:

Sn: 0.01% or more and 0.50% or less;
Sb: 0.01% or more and 0.50% or less; and
Cu: 0.01% or more and 0.50% or less.

3. The steel sheet for a non-oriented electrical steel sheet according to claim 2, further comprising, in mass %, one or more of:

one or more selected from REM: 0.00050% or more and 0.040% or less;
Ca: 0.00050% or more and 0.040% or less; and
Mg: 0.00050% or more and 0.040% or less.

4. The steel sheet for a non-oriented electrical steel sheet according to claim 1, further comprising, in mass %, one or more of:

one or more selected from REM: 0.00050% or more and 0.040% or less;
Ca: 0.00050% or more and 0.040% or less; and
Mg: 0.00050% or more and 0.040% or less.

* * * * *